(12) United States Patent
Kochie et al.

(10) Patent No.: US 9,162,543 B2
(45) Date of Patent: Oct. 20, 2015

(54) TIRE SERVICE HAMMER

(71) Applicants: Robert Kochie, Dodge Center, MN (US); Robert Jensen, Clarks Grove, MN (US); Michael White, Montgomery City, MO (US)

(72) Inventors: Robert Kochie, Dodge Center, MN (US); Robert Jensen, Clarks Grove, MN (US); Michael White, Montgomery City, MO (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 203 days.

(21) Appl. No.: 13/912,934

(22) Filed: Jun. 7, 2013

(65) Prior Publication Data

US 2014/0359949 A1    Dec. 11, 2014

(51) Int. Cl.
*B60C 25/02* (2006.01)
*B25D 1/00* (2006.01)
*B25F 1/00* (2006.01)

(52) U.S. Cl.
CPC . *B60C 25/02* (2013.01); *B25D 1/00* (2013.01); *B25F 1/006* (2013.01); *B25D 2222/42* (2013.01); *Y10T 29/49* (2015.01); *Y10T 29/49945* (2015.01); *Y10T 29/49947* (2015.01); *Y10T 29/49963* (2015.01)

(58) Field of Classification Search
CPC ............ B25D 1/00; B60C 25/02; B25G 3/34; B25G 3/36; Y10T 29/49; Y10T 29/49947
USPC ................... 157/1.3; 7/100, 143, 146, 147
See application file for complete search history.

(56) References Cited

U.S. PATENT DOCUMENTS

| | | | | |
|---|---|---|---|---|
| 506,935 A * | 10/1893 | Morell | ............... | 7/146 |
| 859,796 A * | 7/1907 | Bacon | ............... | 7/146 |
| 1,741,801 A * | 12/1929 | Calvin | ............ | 157/1.1 |
| 2,399,146 A * | 4/1946 | Schumann | ...... | 157/1.3 |
| 5,211,085 A * | 5/1993 | Liou | ................ | 81/20 |
| 5,315,724 A * | 5/1994 | Trujillo et al. | ..... | 7/145 |
| 5,363,897 A * | 11/1994 | Branch | ........... | 157/1.3 |
| 6,527,033 B1 * | 3/2003 | Kliskey | ........... | 157/1.3 |
| 6,564,849 B1 | 5/2003 | Kusner | | |
| 2005/0172415 A1 | 8/2005 | Beek | | |
| 2011/0113566 A1 | 5/2011 | Holbrook | | |

FOREIGN PATENT DOCUMENTS

CN    2076942    9/1991
KR    1019897000497 A    4/1989

OTHER PUBLICATIONS

International Search Report mailed Oct. 16, 2014 for PCT/US2014/041496 filed Jun. 9, 2014.

* cited by examiner

*Primary Examiner* — David B Thomas
(74) *Attorney, Agent, or Firm* — Baker & Hostetler LLP

(57) ABSTRACT

A tire service hammer includes a handle portion and a head portion having a sledge portion, a wedge portion, and a body portion connecting the sledge portion and the wedge portion, wherein the wedge portion includes a bead breaking wedge and a hook extension. A method of manufacturing a tire service hammer includes providing a handle portion and providing a head portion that includes a sledge portion, a wedge portion, and a body portion connecting the sledge portion and the wedge portion, wherein the wedge portion includes a bead breaking wedge and a hook extension. A tire servicing system for repositioning a wheel having a tire mounted on a rim includes a first grasping portion for securing a portion of the rim while repositioning the wheel, and a breaking portion for breaking a tire bead formed between the tire and the rim.

19 Claims, 16 Drawing Sheets

TIRE SERVICE HAMMER

FIELD OF THE DISCLOSURE

The disclosure generally relates to tire servicing tools, and, more particularly, to a tool for manipulating the position of a tire and breaking a tire bead to unseat a tire from a wheel or rim using mechanical leverage.

BACKGROUND OF THE DISCLOSURE

A tire bead is an important structural component of many tires. The tire bead is typically the inner most edge of the inner and outer sidewalls of a tire. When the tire is mounted on a wheel (or rim), these portions of the tire are in direct contact with the wheel (or rim). Particularly in tubeless tires, for example, the tire bead couples with the wheel structure to form an air-tight seal so that an interior pressure chamber may be maintained between the tire and the wheel. The tire may thus be inflated with air, nitrogen, or any other suitable gas, typically via a conventional valve stem. The interior pressure chamber is maintained at a desired pressure, which, in turn, exerts an outwardly directed force against the tire bead to assist in maintaining the air-tight seal.

Due to the strength and rigidity imparted to the sidewalls of many of today's tires, particularly larger automobile and/or truck tires, for example, it is often difficult to break the seal formed between the tire bead and the rim of the wheel in order to unseat the tire from the rim. Accordingly, changing a tire often involves the use of specialized tools to assist in breaking the tire bead. Tools such as hydraulic bead breakers use pressurized air targeted to the area between the tire and the rim to separate the tire from the rim. These tools can be expensive and they depend on a supply of pressurized air to function properly, which can be a problem if trying to change a tire in the field, for example, away from a service shop. Manual bead breakers, such as impact bead breakers and bead breaking hammers are more commonly used to break the bead for changing a tire. Conventional tire service hammers are designed to strike tires to remove them from a vehicle and then break the tire bead seal once removed. However, conventional tire service hammers are not designed to assist in the manipulation of a tire into a desirable position while also providing the capability to easily and effectively break the tire bead on that same tire.

It is disclosed herein to provide a tire service hammer that may be used in a variety of ways to manipulate the position of a wheel (i.e., a tire and rim) while also providing a unique configuration for efficiently and effectively breaking the bead of a tire.

SUMMARY OF THE DISCLOSURE

The foregoing needs are met by the present disclosure, wherein according to certain aspects, a tire service hammer includes a handle portion and a head portion having a sledge portion, a wedge portion, and a body portion connecting the sledge portion and the wedge portion, wherein the wedge portion includes a bead breaking wedge and a hook extension.

In accordance with another aspect of the present disclosure, a method of manufacturing a tire service hammer includes providing a handle portion and providing a head portion that includes a sledge portion, a wedge portion, and a body portion connecting the sledge portion and the wedge portion, wherein the wedge portion includes a bead breaking wedge and a hook extension.

In accordance with yet other aspects of the present disclosure, a tire servicing system for repositioning a wheel having a tire mounted on a rim includes a first grasping portion for securing a portion of the rim while repositioning the wheel, and a breaking portion for breaking a tire bead formed between the tire and the rim, wherein the breaking portion includes an impact surface configured to handle external impacts and a wedge portion configured to be driven between the tire and the rim by the impacts delivered against the impact surface.

There has thus been outlined, rather broadly, certain aspects of the present disclosure in order that the detailed description herein may be better understood, and in order that the present contribution to the art may be better appreciated.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

Figure 1:
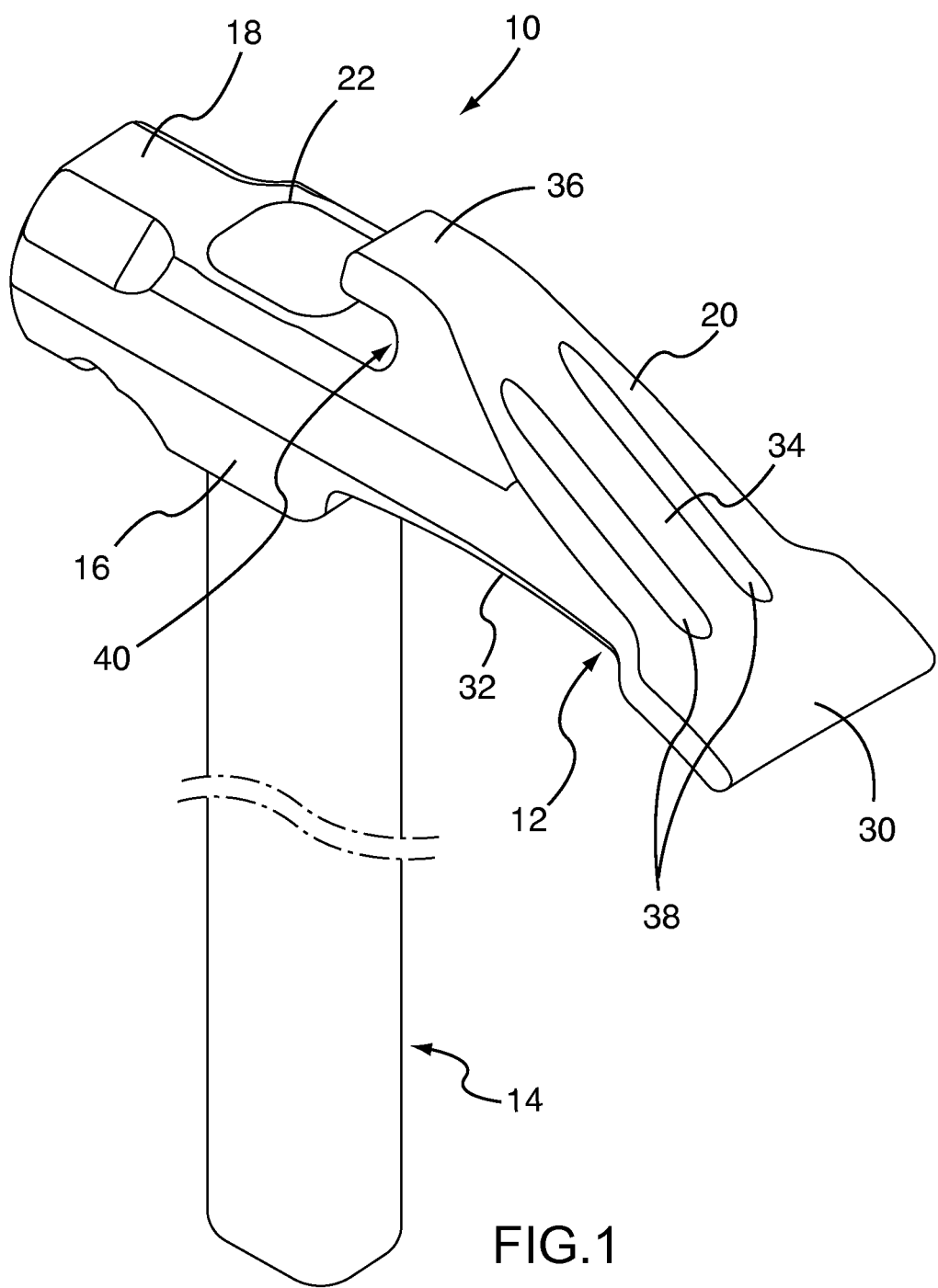
FIG. 1 is a perspective view of a tire service hammer, in accordance with aspects of the present disclosure.

Embodiments in accordance with the invention will now be described with reference to the drawing figures, in which like reference numerals refer to like parts throughout.

Various aspects of tire service hammer may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of a tire service hammer or components thereof in addition to the orientation depicted in the drawings. By way of example, if aspects of a tire service hammer shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

FIGS. 1-6 depict a tire service hammer 10, in accordance with aspects of the present disclosure. The hammer 10 may include a head portion 12 removably coupled to a handle portion 14. The head portion 12 may be forged from any suitable material, such as steel or a steel alloy, for example, and may be induction hardened for longer life. The handle portion 14 is a longitudinal shaft of predetermined length, which may vary depending on the desired use, and may be made of any suitable material, including wood, plastic (polyurethane), fiberglass, metal, or composites. In accordance with certain aspects of the present disclosure, the handle portion 14 may be reinforced with steel bars to resist breaking under heavy loading while being able to absorb the impacts and vibration that may be experienced during the process of manipulating the position of a tire and/or breaking a tire bead.

Figure 7:
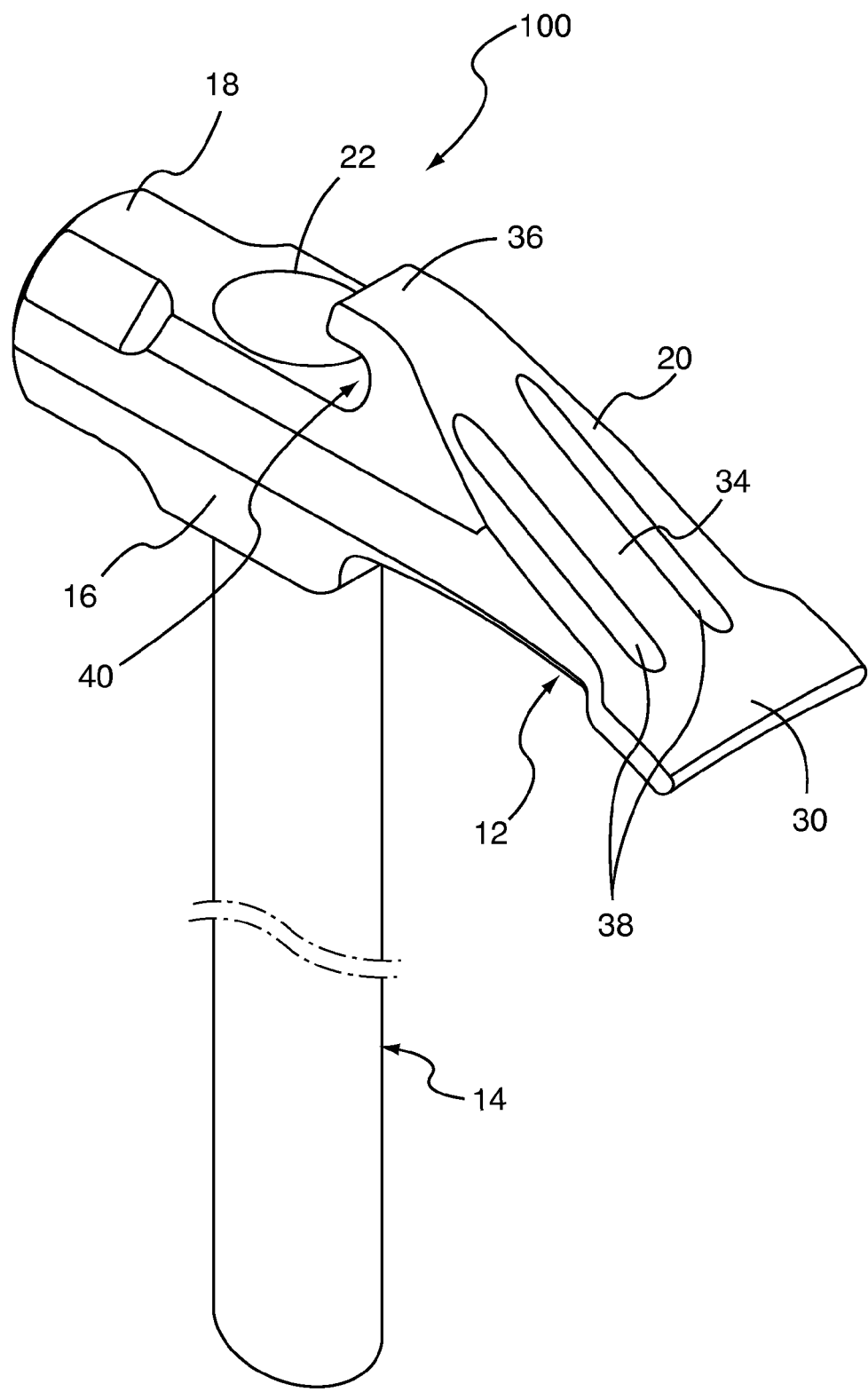
FIG. 7 is a perspective view of a tire service hammer, in accordance with aspects of the present disclosure.

The head portion 12 incorporates a body portion 16 that separates a sledge portion 18 and a wedge portion 20. A through-hole 22 is provided in the body portion 16 for coupling the handle portion 14 to the head portion 12. The through-hole 22 may be configured to be any shape (see, e.g., FIGS. 1 and 7) to generally accommodate a cross-sectional shape of the handle portion 14. The handle portion 14 may be pressure mounted into the through-hole 22 by sliding the head portion 12 onto a distal end of the handle portion 14. In accordance with other aspects of the present disclosure, steel locking plates may be configured into the through-hole 22 and specially bonded to the head portion 12 in order to grab the handle portion 14 and lock the head portion 12 in position when the head portion 12 is slidably mounted onto the handle portion 14. In accordance with yet other aspects of the present disclosure, the head portion 12 may be joined to the handle portion 14 by welding, screw thread, or any other suitable fasteners.

Figure 2:
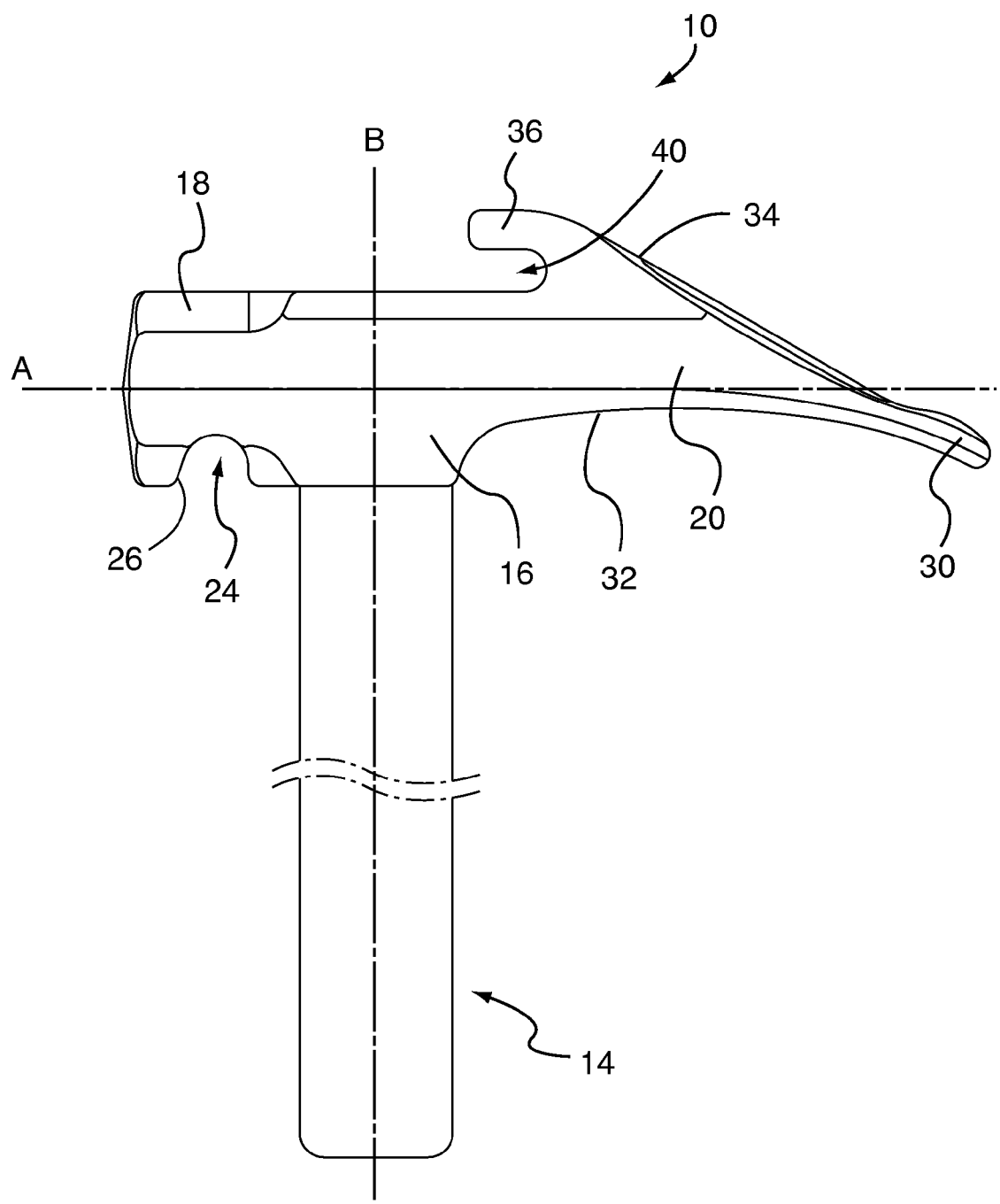
FIG. 2 is a side view of the tire service hammer shown in FIG. 1, in accordance with aspects of the present disclosure.
Figure 3:
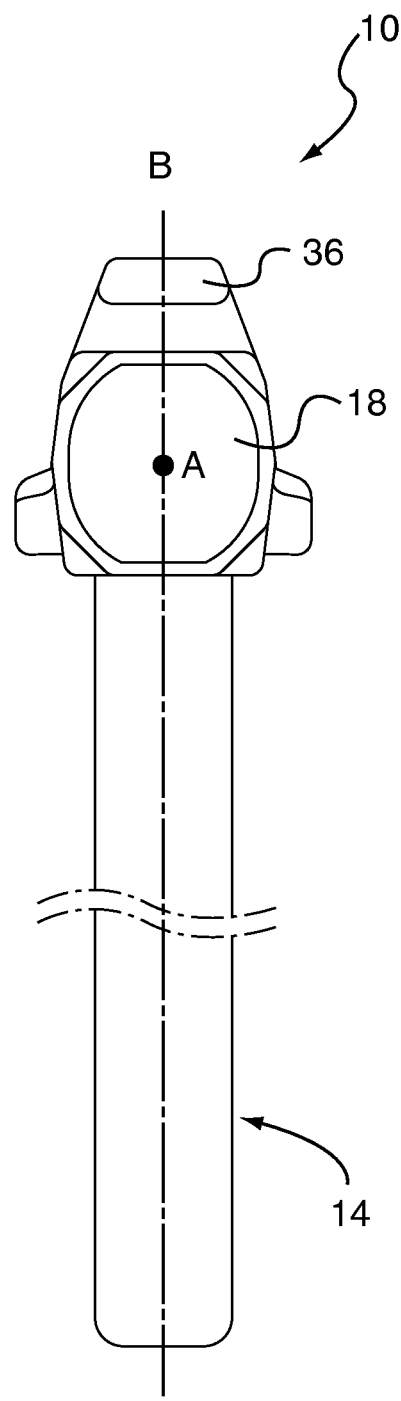
FIG. 3 is a front view of the tire service hammer shown in FIG. 1, in accordance with aspects of the present disclosure.

As shown more particularly in FIGS. 2 and 3, a transverse axis A of the head portion 12 may extend substantially perpendicular to and intersect a longitudinal axis B of the handle portion 14. The body portion 16 and the sledge portion 18 of the head portion 12 may be formed to be substantially centered about the transverse axis A with the wedge portion 20 configured to be substantially situated above a horizontal plane that intersects the transverse axis A.

Figure 13:
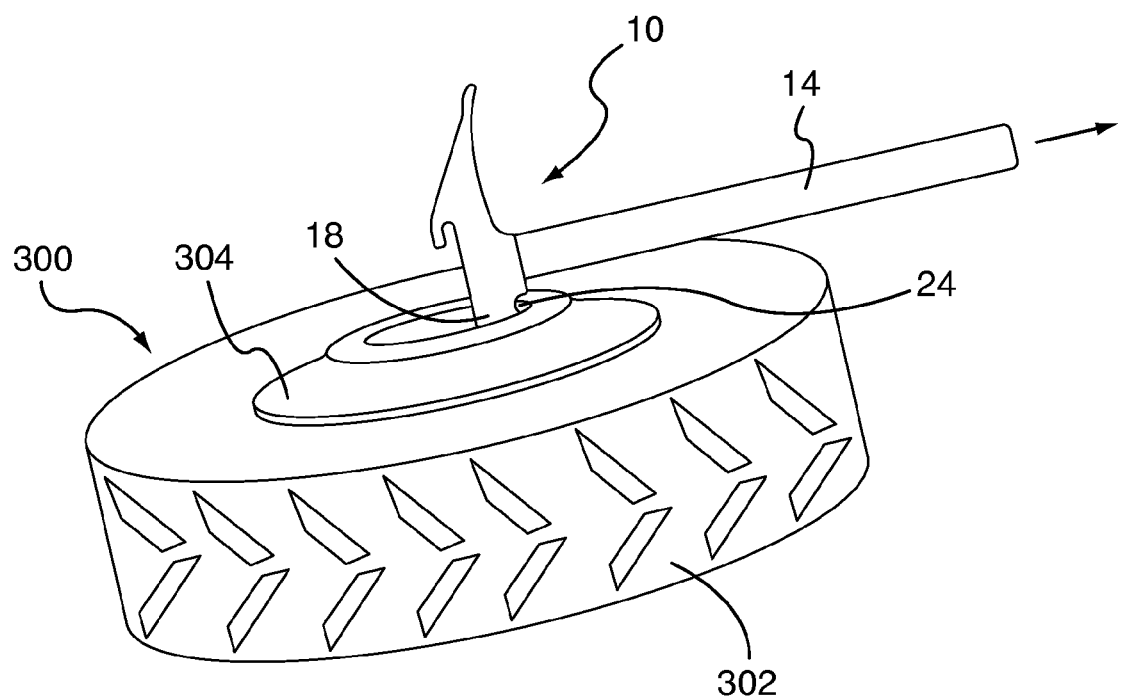
FIG. 13 illustrates a tire service hammer in a state of use, in accordance with aspects of the present disclosure.

The sledge portion 18 may be cylindrical in configuration in order to withstand the impact of a hammer or other device while safely and effectively transferring the applied force from such hammer or device through the body portion 16 to the wedge portion 20. In accordance with yet other aspects of the present disclosure, as shown in FIG. 2, a relief portion 24 may be formed along a peripheral portion of the sledge portion 18 of the head portion 12. The relief portion 24 may be a substantially semi-circular trough formed through the lower peripheral portion of the sledge portion 18 in a direction perpendicular to the transverse axis A. A lip 26 is defined toward the rear of the hammer 10 for catching the edge of the center portion of a rim, for example, as shown in FIG. 13. The relief portion 24 is configured to hook onto the portion of the wheel or rim. The relief portion 24 allows a user to engage and secure the wheel with the service hammer 10 in a manner that provides significant leverage via the handle portion 14 for dragging or lifting the wheel into a more desirable position.

Figure 4:
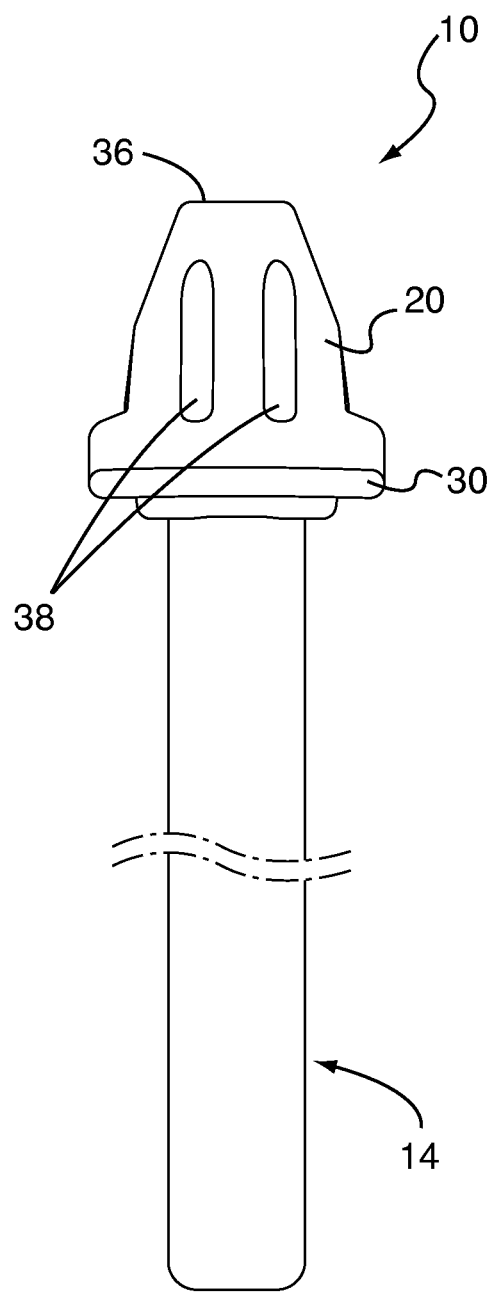
FIG. 4 is a rear view of the tire service hammer shown in FIG. 1, in accordance with aspects of the present disclosure.
Figure 5:
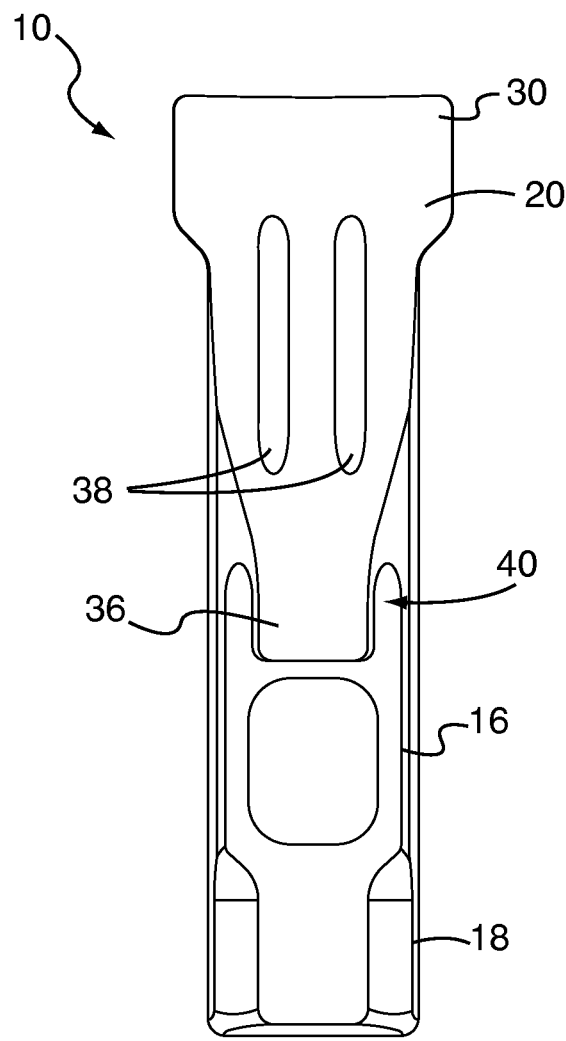
FIG. 5 is a top view of the tire service hammer shown in FIG. 1, in accordance with aspects of the present disclosure.
Figure 6:
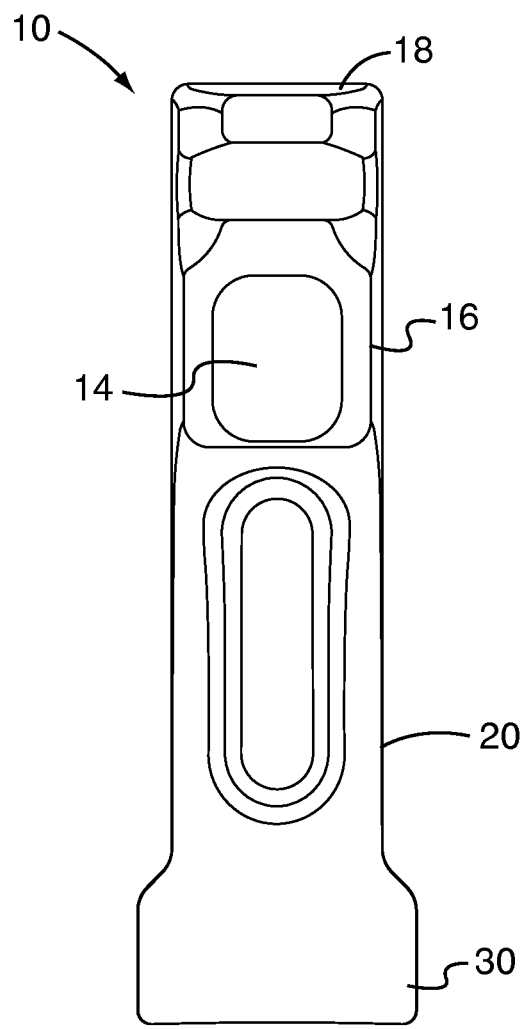
FIG. 6 is a bottom view of the tire service hammer shown in FIG. 1, in accordance with aspects of the present disclosure.

As shown in FIGS. 1 and 2, the wedge portion 20 of the head portion 12 may be configured with a bead breaking wedge 30 towards a lower distal end and a lower surface 32 having a smooth, cambered shape that extends from the body portion 16 toward the bead breaking wedge 30. An upper sloping surface 34 of the wedge portion 20 extends from the bead breaking wedge 30 to a hook extension 36. The upper sloping surface 34 extends generally in a plane that forms an oblique angle with the both the transverse axis A and the longitudinal axis B. As shown in FIG. 4, for example, the upper sloping surface 34 may have a lateral dimension that is widest at the distal end of the bead breaking wedge 30 and tapers to a narrower lateral dimension at the hook extension 36. The bead breaking wedge 30 and/or the upper sloping surface 34 may be formed to have a slightly convex shape and may be provided with grooves 38 that extend along the upper sloping surface 34 towards the distal end of the bead breaking wedge 30. In accordance with some aspects of the present disclosure, the grooves 38 may extend the entire way through to the distal end of the bead breaking wedge 30. The grooves 38 and the convex shape of the bead breaking wedge 30 may be used to drive a tire lubricant into the tire bead during use of the tire service hammer 10.

The hook extension 36 defines a lateral channel 40 for securing a portion of a wheel or rim therein. The lateral channel 40 may be semicircular in shape or any other suitable shape for securing an inner portion of a wheel or rim therein. Preferably, the surfaces and edges of the tire service hammer 10 are smooth or beveled in order to prevent damage during the handling of a wheel or rim and/or during the process of changing a tire (i.e., breaking the bead as described in further detail below).

Figure 8:
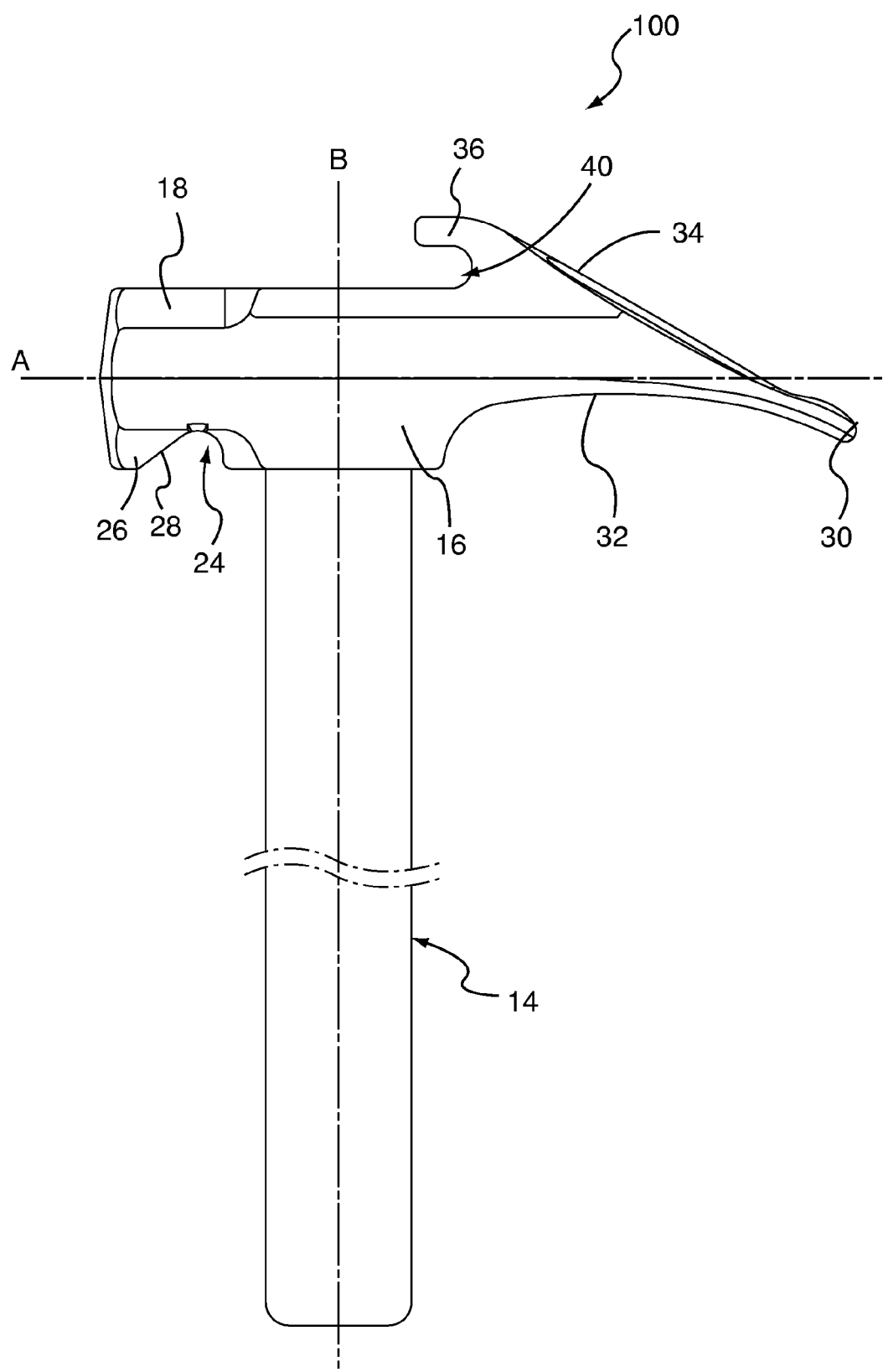
FIG. 8 is a side view of the tire service hammer shown in FIG. 7, in accordance with aspects of the present disclosure.
Figure 9:
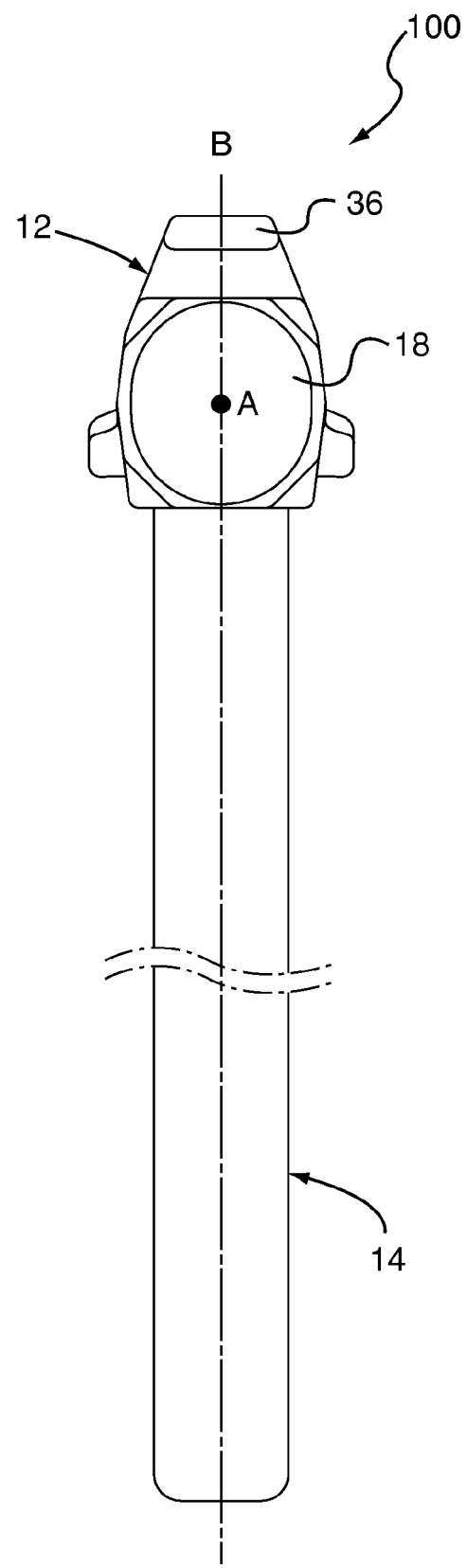
FIG. 9 is a front view of the tire service hammer shown in FIG. 7, in accordance with aspects of the present disclosure.
Figure 10:
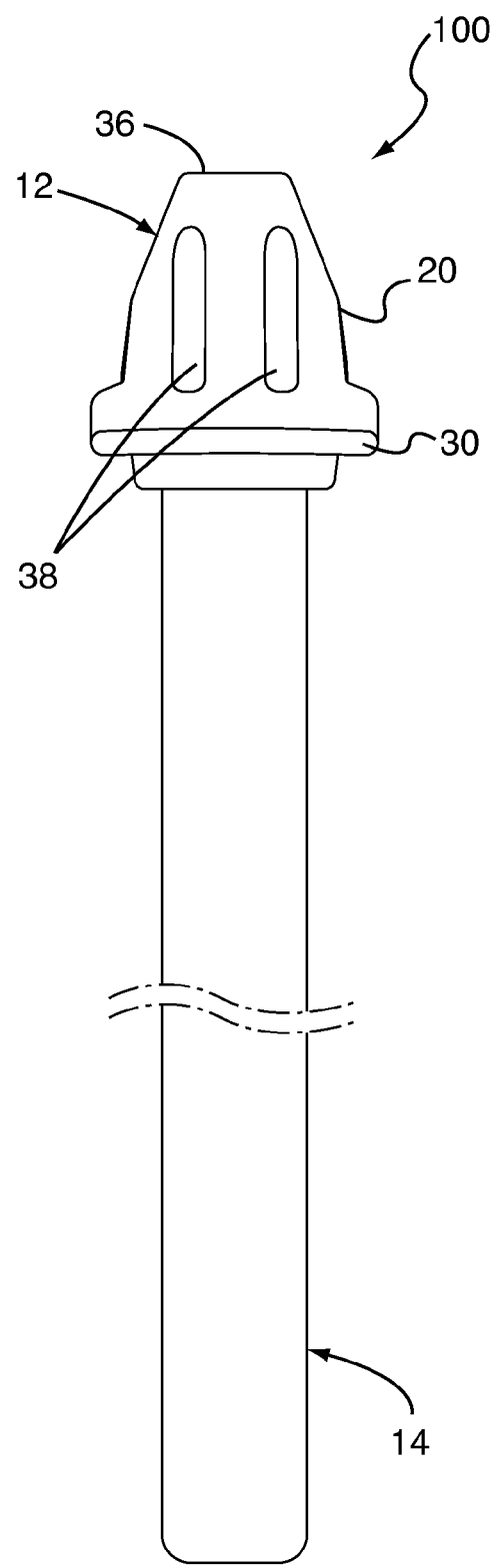
FIG. 10 is a rear view of the tire service hammer shown in FIG. 7, in accordance with aspects of the present disclosure.
Figure 11:
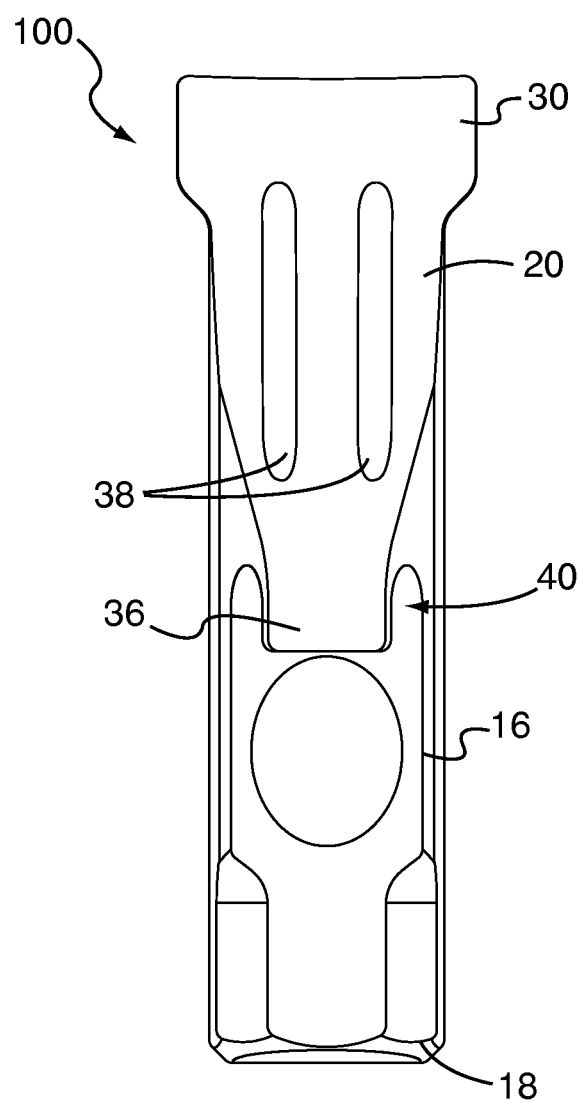
FIG. 11 is a top view of the tire service hammer shown in FIG. 7, in accordance with aspects of the present disclosure.
Figure 12:
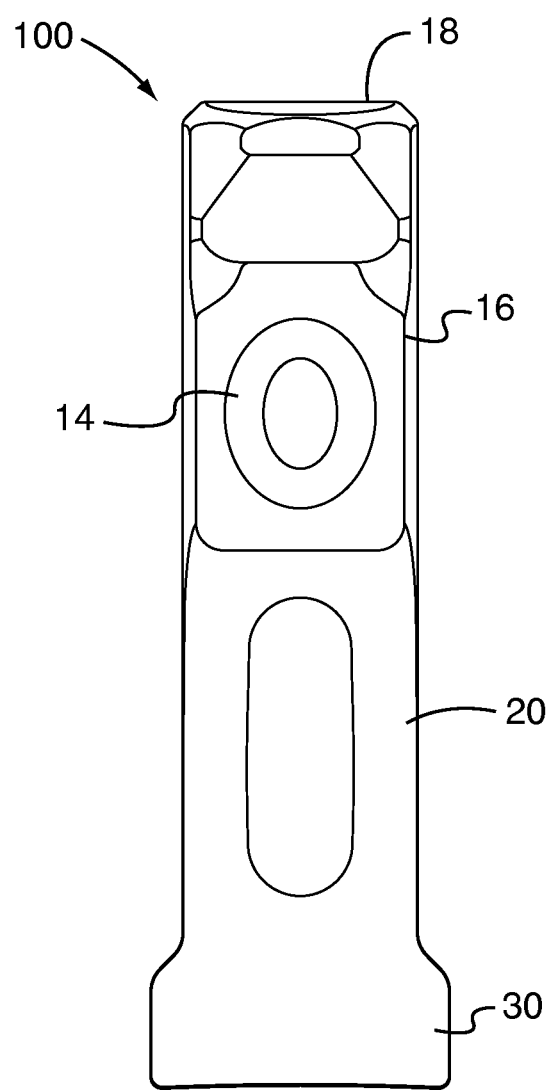
FIG. 12 is a bottom view of the tire service hammer shown in FIG. 7, in accordance with aspects of the present disclosure.

FIGS. 7-12 illustrate a tire service hammer 100 in accordance with aspects of the present disclosure. The tire service hammer 100 of FIGS. 7-12 shares many of the same features as the tire service hammer in FIGS. 1-6, however, may be configured for use with larger tires. For example, as shown in FIG. 8, the relief portion 24 may include a flat sloping rear surface 28 that provides increased surface area for lip 26 to be used as a catch. In this manner, the service hammer 10 may be used to engage and position larger tires having rims or wheels composed of thicker component parts. The head portion 12 may be larger and heavier, for example, and/or the handle portion 14 may be thicker and/or longer.

FIG. 13 illustrates a usage of an exemplary tire service hammer 10 in accordance with the present disclosure. A wheel 300 having a tire 302 mounted on a rim 304 may be heavy and difficult to maneuver once removed from a vehicle. In this case, the tire service hammer 10 may be used to maneuver or assist in maneuvering the wheel 300 into a desirable position where the same tire service hammer 10 may then be used to break the tire bead for removal of the tire 302 from the rim 304. To use the tire service hammer 10 in this manner, a user simply aligns the relief portion 24 provided in the sledge portion 18 to catch and secure a portion of the rim 304, for example. The lip 26, which cannot be seen in FIG. 13, cradles the portion of the rim 304 secured in the relief portion 24 so that the user may lift and or drag the wheel 300, relying on the increased leverage and maneuverability made possible through the extended handle 14 of the service hammer 10.

Figure 14:
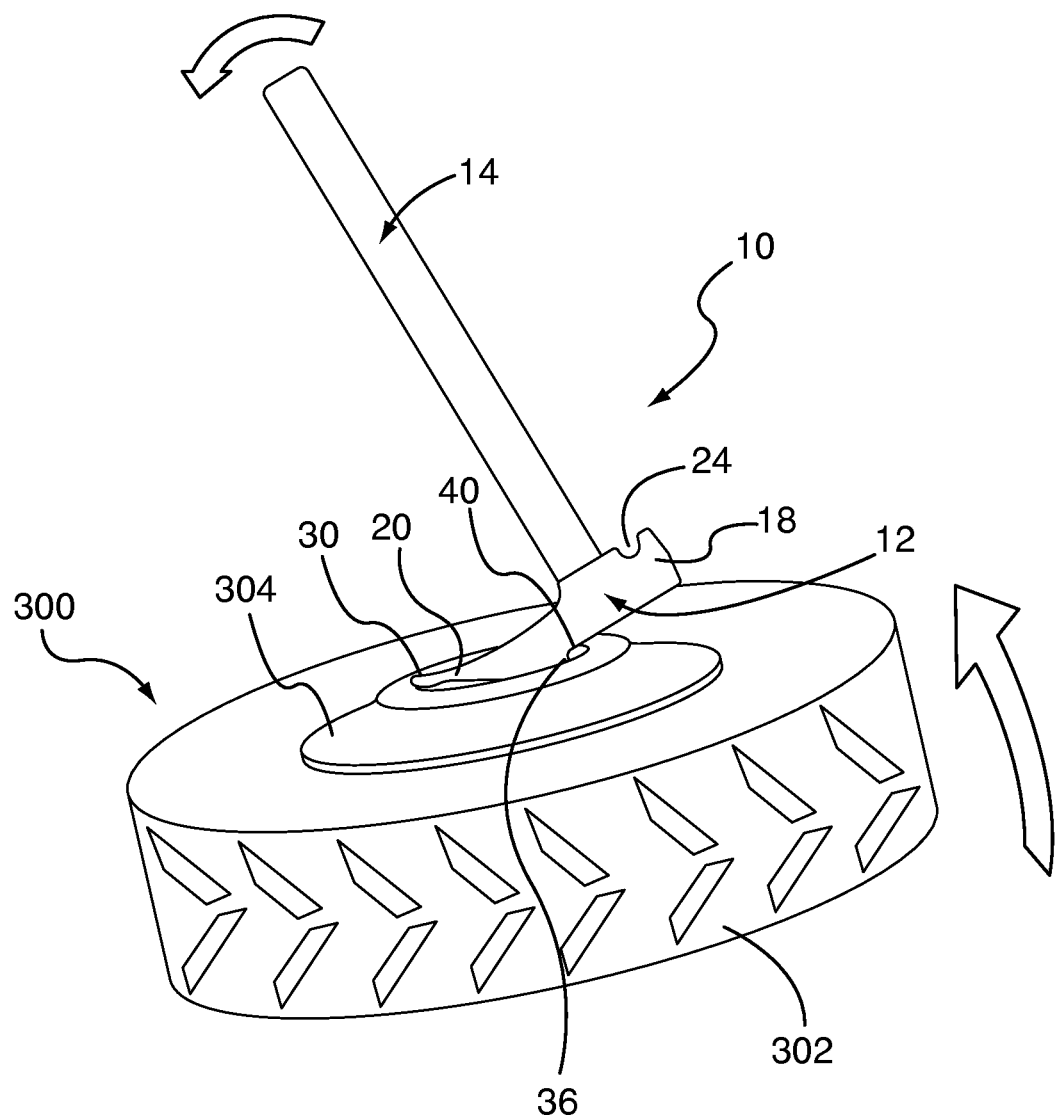
FIG. 14 illustrates a tire service hammer in a different state of use, in accordance with aspects of the present disclosure.

FIG. 14 illustrates another exemplary usage of the service hammer 10 in accordance with aspects of the present disclosure. The tire service hammer 10 may be used to further maneuver or assist in maneuvering the wheel 300 by being used as a tipping tool. In this case, the user may engage the hook extension 36 of the wedge portion 20 to a portion of the rim 304. The user may engage the rim 304, for example, by sliding the lateral channel 40 around an appropriate portion of the rim 304. The wedge portion 20, including the bead breaking wedge 30, may be positioned against another portion of the rim 304, as shown in FIG. 14, in order to essentially lock the head portion 12 to the wheel 300. With the head portion 12 engaged with the wheel in a secure position, application of force against the end of the handle portion 14 as shown creates significant mechanical advantage for the user to tip the wheel 300 up as indicated by the arrow by using the head portion 12 as a fulcrum. The user may thus safely and effectively maneuver the wheel 300 while avoiding the possibility of injury that can result from having to bend over and attempting to tip the wheel 300 into a desirable position without the mechanical advantage gained through use of the service hammer 10 as a tipping tool.

Figure 15:
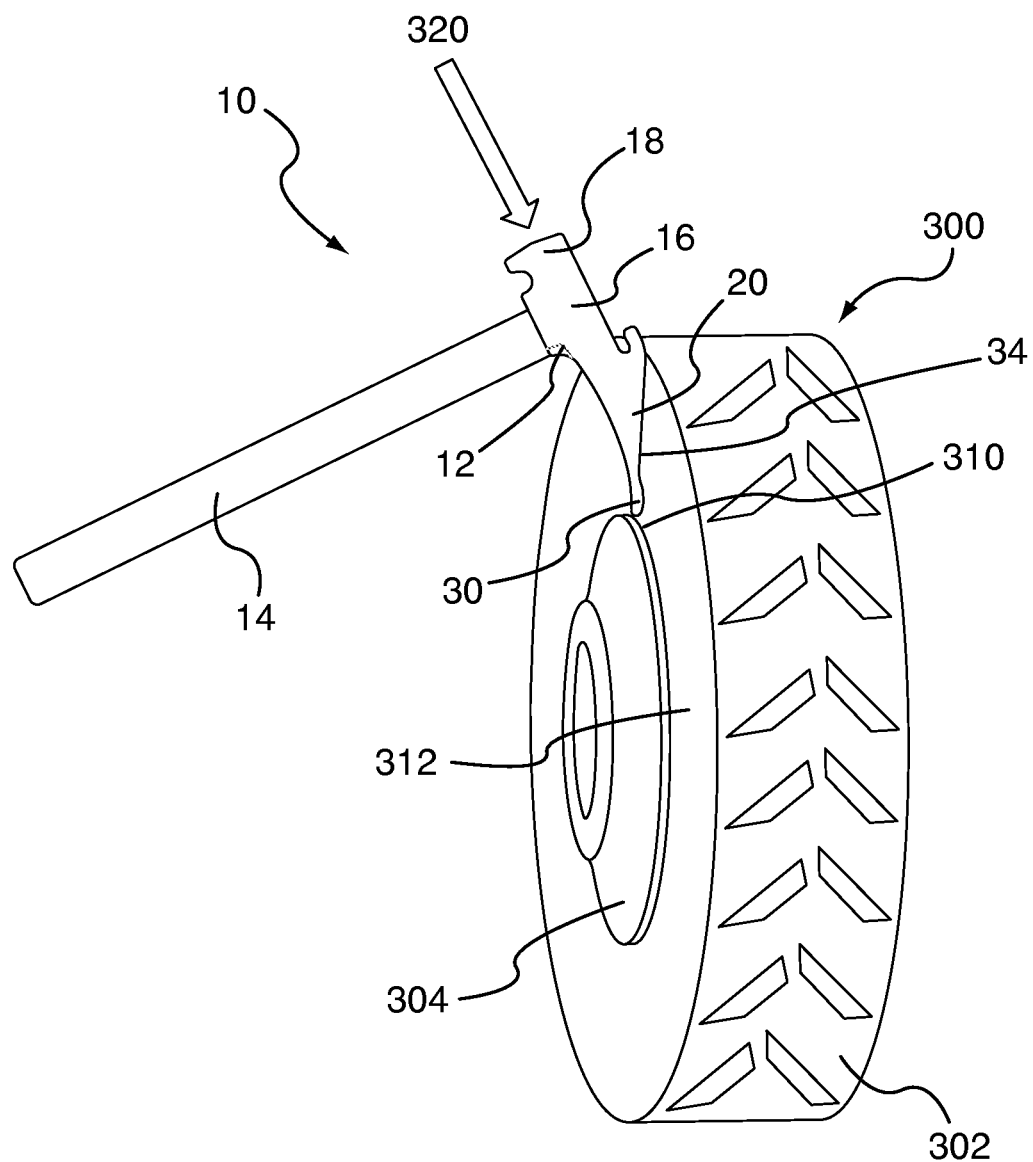
FIG. 15 illustrates a tire service hammer in yet another state of use, in accordance with aspects of the present disclosure.
Figure 16:
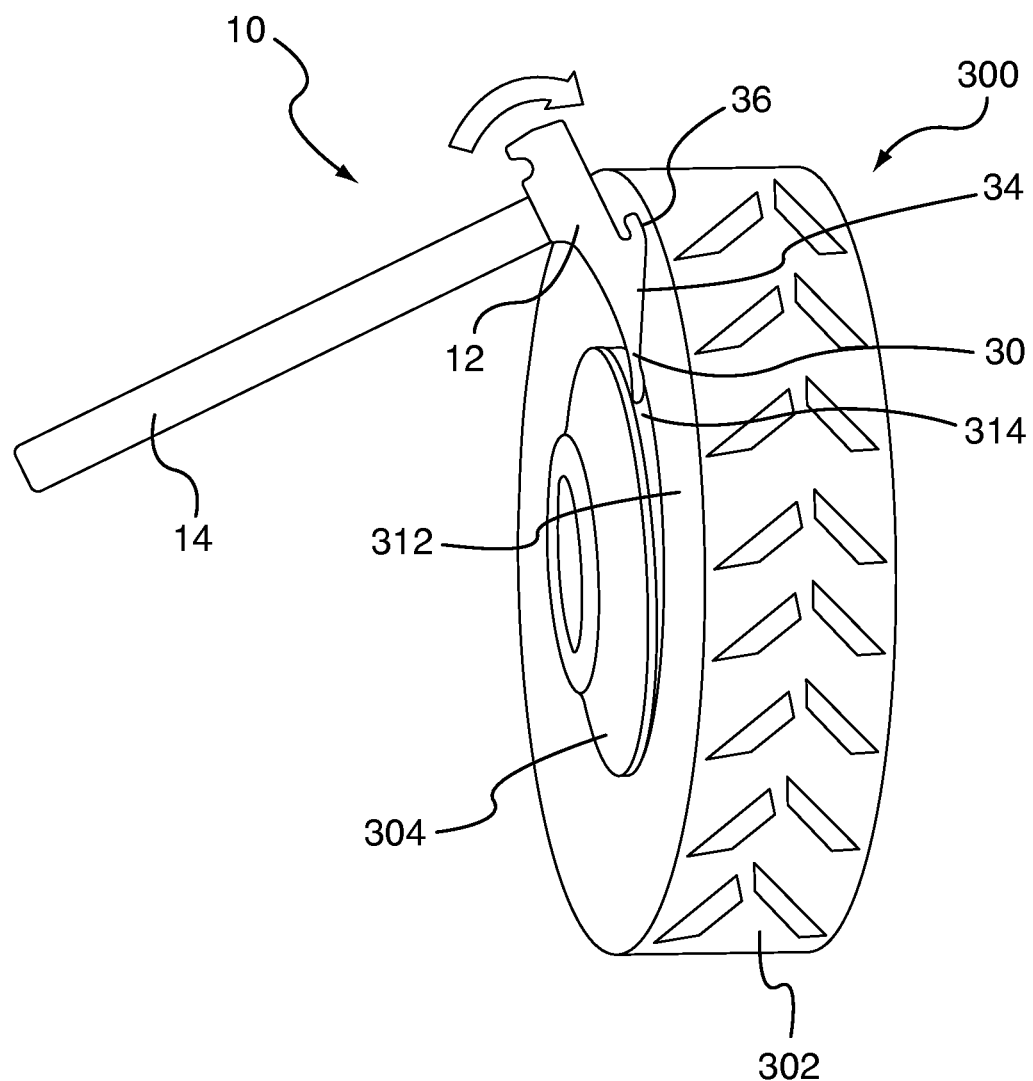
FIG. 16 illustrates the tire service hammer shown in FIG. 15 in a further state of use, in accordance with aspects of the present disclosure.

FIGS. 15 and 16 illustrate usage of the service hammer 10 as a bead breaking tool, in accordance with yet other aspects of the present disclosure. As illustrated in FIG. 15, the bead breaking wedge 30 of the hammer 10 may first be aligned with a ridge 310 where the tire 302 meets the rim 304. A separating force may be applied by a user via the handle portion 14 of the tire service hammer 10. For example, the user may push the tire service hammer 10 against the tire and apply the separating force in order to push the tire 302 slightly away from the metal rim 304 of the wheel. The sloped upper surface 34 of the service hammer 10 may be dimensioned to correspond to a sidewall 312 of the tire 302 mounted on the metal rim 304 of the wheel 300. The separating force applied by the user may be efficiently transferred from the handle portion 14 to the sloped upper surface 34, including the hook extension 36. The sloped upper surface 34 may push back the sidewall 312 of the tire 302 to create an opening 314 between the tire 302 and the metal rim 304 of the wheel 300.

As illustrated in FIG. 16, the bead breaking wedge 30 of the tire service hammer 10 may be inserted into the opening 314 between the tire 302 and the metal rim 304 of the wheel 300. A striking force 320 may be applied via an external impact (e.g., via a rubber mallet) to the sledge portion 18 of the hammer 10 to further push the sidewall 312 of the tire 302 back to enlarge the opening 314 between the tire 302 and the metal rim 304 of the wheel 300, while simultaneously driving the bead breaking wedge 30 deeper into the opening 314. With the bead breaking wedge 30 driven into the opening 314, as shown in FIG. 16, the user may take advantage of the leverage provided by the handle portion 14 and the design of the head portion 12 to rotate the handle portion 14 in a direction that will further push the sidewall 312 up and away from the rim 304 in order to break the bead of the tire 302 and separate the tire 302 from the rim 304. The tire service hammer 10 may be used at different portions of the tire 302 and the metal rim 304 in order to break the tire bead and separate the tire 302 from the rim 304.

Although described above with reference to tire service hammer 10, the same methods for usage may be applied to the tire service hammer 100. It is to be understood that any feature described in relation to any one aspect may be used alone, or in combination with other features described, and may also be used in combination with one or more features of any other of the disclosed aspects, or any combination of any other of the disclosed aspects.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A tire service hammer comprising:
   a handle portion; and
   a head portion that comprises:
      a sledge portion;
      a relief portion formed in a peripheral portion of the sledge portion;
      a wedge portion; and
      a body portion connecting the sledge portion and the wedge portion, wherein the wedge portion includes a bead breaking wedge and a hook extension.

2. The tire service hammer of claim 1, wherein the body portion comprises a through-hole for coupling the handle portion to the head portion.

3. The tire service hammer of claim 1, further comprising a transverse axis, wherein the body portion and the sledge portion are configured to be substantially centered about the transverse axis.

4. The tire service hammer of claim 3, further comprising a longitudinal axis, wherein the transverse axis and the longitudinal axis are substantially perpendicular.

5. The tire service hammer of claim 4, wherein the wedge portion further comprises an upper sloping surface that extends from the bead breaking wedge to the hook extension.

6. The tire service hammer of claim 5, wherein the upper sloping surface extends generally in a plane that forms an oblique angle with both the transverse axis and the longitudinal axis.

7. The tire service hammer of claim 5, wherein the upper sloping surface has a lateral dimension that is widest at a distal end of the bead breaking wedge and that tapers to a narrower lateral dimension at the hook extension.

8. The tire service hammer of claim 5, wherein the upper sloping surface is configured with grooves.

9. The tire service hammer of claim 8, wherein the bead breaking wedge is convex to assist the grooves in conveying a lubricant.

10. The tire service hammer of claim 3, wherein the wedge portion is configured to be substantially situated above a horizontal plane that intersects the transverse axis.

11. The tire service hammer of claim 1, wherein the relief portion is a semi-circular trough formed through the peripheral portion of the sledge portion in a direction perpendicular to the transverse axis.

12. The tire service hammer of claim 11, wherein the relief portion includes a flat sloping rear surface.

13. The tire service hammer of claim 1, wherein the hook extension defines a lateral channel.

14. The tire service hammer of claim 13, wherein the lateral channel is semicircular in shape.

15. A method of manufacturing a tire service hammer comprising:
   providing a handle portion; and
   providing a head portion that comprises:
      a sledge portion, wherein a relief portion is formed in a peripheral portion of the sledge portion;
      a wedge portion; and
      a body portion connecting the sledge portion and the wedge portion, wherein the wedge portion includes a bead breaking wedge and a hook extension.

16. The method of claim 15, wherein the handle portion is joined to the head portion by welding, screw thread, fasteners, or press fit.

17. The method of claim 15, wherein the body portion and the sledge portion are configured to be substantially centered about a transverse axis.

18. A tire servicing system for repositioning a wheel having a tire mounted on a rim, comprising:
   a first grasping portion for securing a portion of the rim while repositioning the wheel; and
   a breaking portion for breaking a tire bead formed between the tire and the rim, the breaking portion comprising:
      an impact surface configured to handle external impacts;
      a relief portion formed in a peripheral portion of the impact surface; and
      a wedge portion configured to be driven between the tire and the rim by the impacts delivered against the impact surface.

19. The tire servicing system of claim 18, further comprising:
   a second grasping portion for securing a portion of the rim while repositioning the wheel.

* * * * *